United States Patent
Smith

(10) Patent No.: US 10,699,612 B2
(45) Date of Patent: *Jun. 30, 2020

(54) DISPLAY SYSTEM WITH SPECULAR REFLECTIVE MODE

(71) Applicant: Sharp Kabushiki Kaisha, Osaka (JP)

(72) Inventor: Nathan James Smith, Oxford (GB)

(73) Assignee: SHARP KABUSHIKI KAISHA, Osaka (JP)

(*) Notice: Subject to any disclaimer, the term of this patent is extended or adjusted under 35 U.S.C. 154(b) by 943 days.

This patent is subject to a terminal disclaimer.

(21) Appl. No.: 14/524,467

(22) Filed: Oct. 27, 2014

(65) Prior Publication Data

US 2016/0119613 A1  Apr. 28, 2016

(51) Int. Cl.
*G09G 3/00* (2006.01)
*G02F 1/1335* (2006.01)
(Continued)

(52) U.S. Cl.
CPC ........... *G09G 3/003* (2013.01); *G02F 1/1347* (2013.01); *G02F 1/133504* (2013.01);
(Continued)

(58) Field of Classification Search
None
See application file for complete search history.

(56) References Cited

U.S. PATENT DOCUMENTS 4,840,463 A  6/1989 Clark et al.
4,958,916 A  9/1990 Clark et al.
(Continued)

FOREIGN PATENT DOCUMENTS

CN  1189224  7/1998
CN  102016961  4/2011
(Continued)

OTHER PUBLICATIONS

Yamamoto et al., "Optimum Parameteres and Viewing Areas of Stereoscopic Full-Color LED Display Using Parallax Barrier", IEICE Trans Electron, vol. E83-C, No. 10, Oct. 2000.
(Continued)

*Primary Examiner* — William Boddie
*Assistant Examiner* — Alecia D English
(74) *Attorney, Agent, or Firm* — Renner, Otto, Boisselle & Sklar, LLP

(57) ABSTRACT

A display system includes a first image display, a second image display, a specular reflective polariser disposed between the first image display and the second image display, and an optical diffuser layer disposed between the first image display and reflective polariser. The reflective polariser and optical diffuser may be combined into a single film with the reflective polariser disposed on a viewing side of the display system, and the optical diffuser disposed between the first image display and reflective polariser. A controller is configured to address image data to the first image display and the second image display. The controller, the first image display and second image display are configured to selectively operate to pass light through the specular reflective polariser and the optical diffuser layer in accordance with multiple display functions in which the first image display and the second image display have different viewing properties to a viewer.

20 Claims, 6 Drawing Sheets

(51) Int. Cl.
  *H04N 9/30*    (2006.01)
  *G09G 3/3208*  (2016.01)
  *G09G 3/36*    (2006.01)
  *G02F 1/1347*  (2006.01)
  *H04N 13/315*  (2018.01)

(52) U.S. Cl.
  CPC ..... *G02F 1/133528* (2013.01); *G09G 3/3208* (2013.01); *G09G 3/3651* (2013.01); *H04N 9/30* (2013.01); *H04N 13/315* (2018.05); *G09G 2300/023* (2013.01); *G09G 2300/0456* (2013.01); *G09G 2320/028* (2013.01); *G09G 2330/021* (2013.01)

(56) References Cited

U.S. PATENT DOCUMENTS

| | | | |
|---|---|---|---|
| 5,686,979 A * | 11/1997 | Weber | E06B 9/24 349/96 |
| 6,249,332 B1 | 6/2001 | Bryan-Brown et al. | |
| 6,373,457 B1 | 4/2002 | Kim et al. | |
| 6,445,434 B2 | 9/2002 | Takato et al. | |
| 6,646,697 B1 | 11/2003 | Sekiguchi et al. | |
| 6,992,741 B2 | 1/2006 | Kitson et al. | |
| 7,019,795 B2 | 3/2006 | Jones | |
| 7,375,784 B2 | 5/2008 | Smith et al. | |
| 7,495,719 B2 | 2/2009 | Adachi et al. | |
| 7,813,042 B2 | 10/2010 | Mather et al. | |
| 2003/0043313 A1 | 3/2003 | Minoura | |
| 2004/0085660 A1 | 5/2004 | Hara | |
| 2004/0165135 A1* | 8/2004 | Jones | G02F 1/133753 349/142 |
| 2005/0030158 A1 | 2/2005 | Schulmerich et al. | |
| 2005/0195344 A1 | 9/2005 | Chang et al. | |
| 2005/0270463 A1 | 12/2005 | Akahane et al. | |
| 2006/0023146 A1 | 2/2006 | Yang et al. | |
| 2006/0082699 A1* | 4/2006 | Gehlsen | G02F 1/133606 349/61 |
| 2006/0202942 A1 | 9/2006 | Fong | |
| 2006/0262258 A1 | 11/2006 | Wang et al. | |
| 2007/0058257 A1 | 3/2007 | Lynam | |
| 2007/0097504 A1 | 5/2007 | Li et al. | |
| 2007/0242028 A1* | 10/2007 | Kitagawa | G02F 1/133504 345/100 |
| 2007/0296911 A1 | 12/2007 | Hong | |
| 2008/0002432 A1 | 1/2008 | Ueno et al. | |
| 2008/0198294 A1 | 8/2008 | Hwang et al. | |
| 2008/0232080 A1 | 9/2008 | Lamberth et al. | |
| 2008/0273145 A1 | 11/2008 | Akiyama | |
| 2009/0058787 A1 | 3/2009 | Weng et al. | |
| 2009/0310071 A1 | 12/2009 | Hwang et al. | |
| 2011/0122329 A1 | 5/2011 | Broughton et al. | |
| 2011/0267317 A1 | 11/2011 | Tsuda | |
| 2013/0148044 A1 | 6/2013 | Ohyama et al. | |
| 2014/0049734 A1* | 2/2014 | Erinjippurath | G09G 3/3611 349/96 |
| 2015/0042704 A1* | 2/2015 | Smith | H04N 13/0402 345/697 |

FOREIGN PATENT DOCUMENTS

| | | |
|---|---|---|
| EP | 0 933 633 A1 | 8/1999 |
| EP | 0933663 A1 | 8/1999 |
| GB | 2457692 | 8/2009 |
| GB | 1103815 | 3/2011 |
| JP | 3419766 | 6/2003 |
| JP | 2007/127724 | 5/2007 |
| JP | 2010/20211 | 1/2010 |
| WO | WO 98/54616 | 12/1998 |
| WO | WO 2007/126148 | 11/2007 |
| WO | WO 2014002402 A1 | 1/2014 |

OTHER PUBLICATIONS

Takagi et al., "30.3: Autostereoscopic Partial 2-D/3-D Switchable Display Using Liquid-Crystal Gradient Index Lens", SID Digest 2010, pp. 436, ISSN 0097966X/10/4101-0436.

Bryan-Brown et al., "Grating Aligned Bistable Nematic Device", Proc. SID XXVIII 5.3, pp. 37-40 (1997).

Yeh et al., "Optics of Liquid Crystal Displays", Wiley 1999, pp. 194-213.

Xie et al., "0°-360° bistable nematic liquid crystal display with large dΔn and high constrast", Journal of Applied Physics, vol. 88, No. 4, p. 1722, Aug. 15, 2000.

Office Action for co-pending U.S. Appl. No. 13/532,154, dated Feb. 13, 2015

Final Office Action for co-pending U.S. Appl. No. 13/532,154, dated Aug. 26, 2015.

Office Action for co-pending U.S. Appl. No. 14/524,446, dated Jan. 20, 2016.

Final Office Action for related U.S. Appl. No. 13/532,154, dated Jul. 15, 2016.

Office Action for co-pending U.S. Appl. No. 13/532,154, dated Jan. 15, 2016.

Final Office Action for related U.S. Appl. No. 14/524,446, dated Aug. 31, 2016.

Office Action for related U.S. Appl. No. 14/524,446, dated Jun. 12, 2017.

Post-prosecution Pilot Program Decision (P3) for related U.S. Appl. No. 14/524,446, dated Jan. 17, 2017.

Office Action for related U.S. Appl. No. 13/532,154, dated Dec. 29, 2016.

Notice of Decision from Post-Prosecution Pilot Program(P3) Conference for related U.S. Appl. No. 13/532,154, dated Oct. 14, 2016.

Office Action for related U.S. Appl. No. 14/524,446 dated Jan. 10, 2018, 15 pages.

Advisory Action for related U.S. Appl. No. 14/524,446 dated Apr. 16, 2018, 4 pages.

Co-pending U.S. Appl. No. 13/532,154, filed Jun. 25, 2012 (current claims provided).

Co-pending U.S. Appl. No. 14/524,446, filed Oct. 27, 2014.

Examiner's Answer for related U.S. Appl. No. 14/524,446 dated Oct. 5, 2018, 21 pages.

* cited by examiner

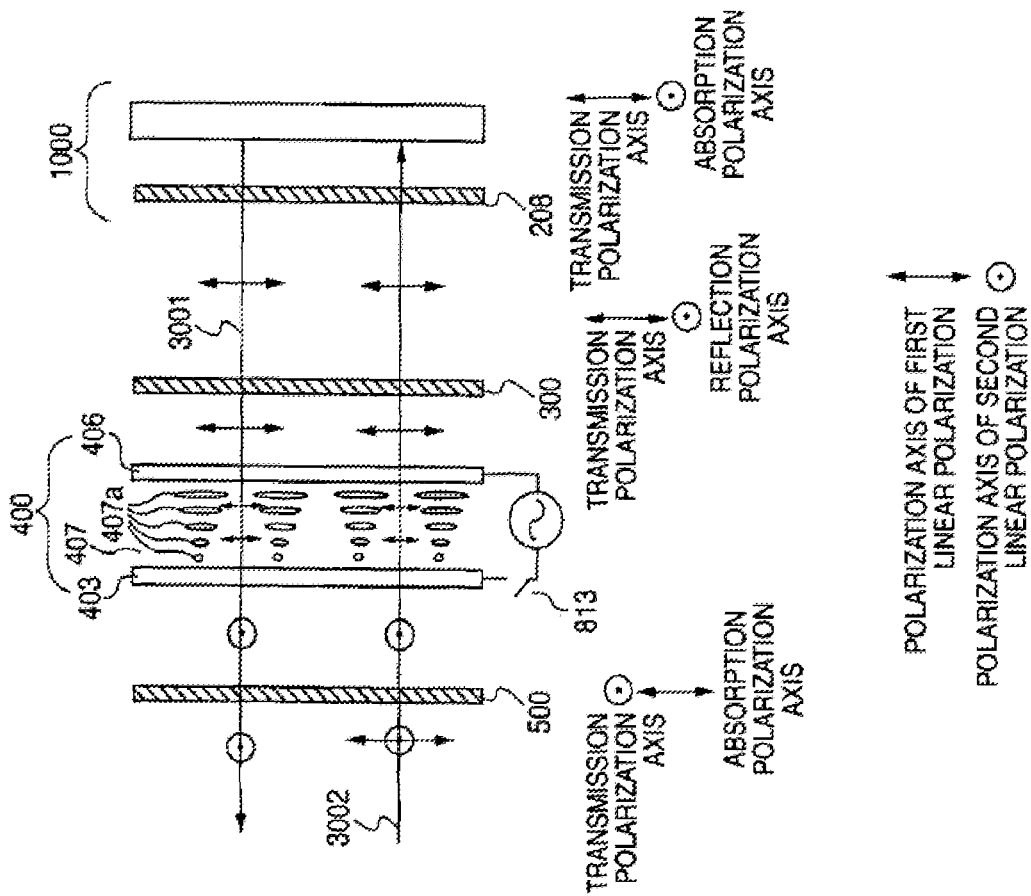
Figure 1: Prior Art

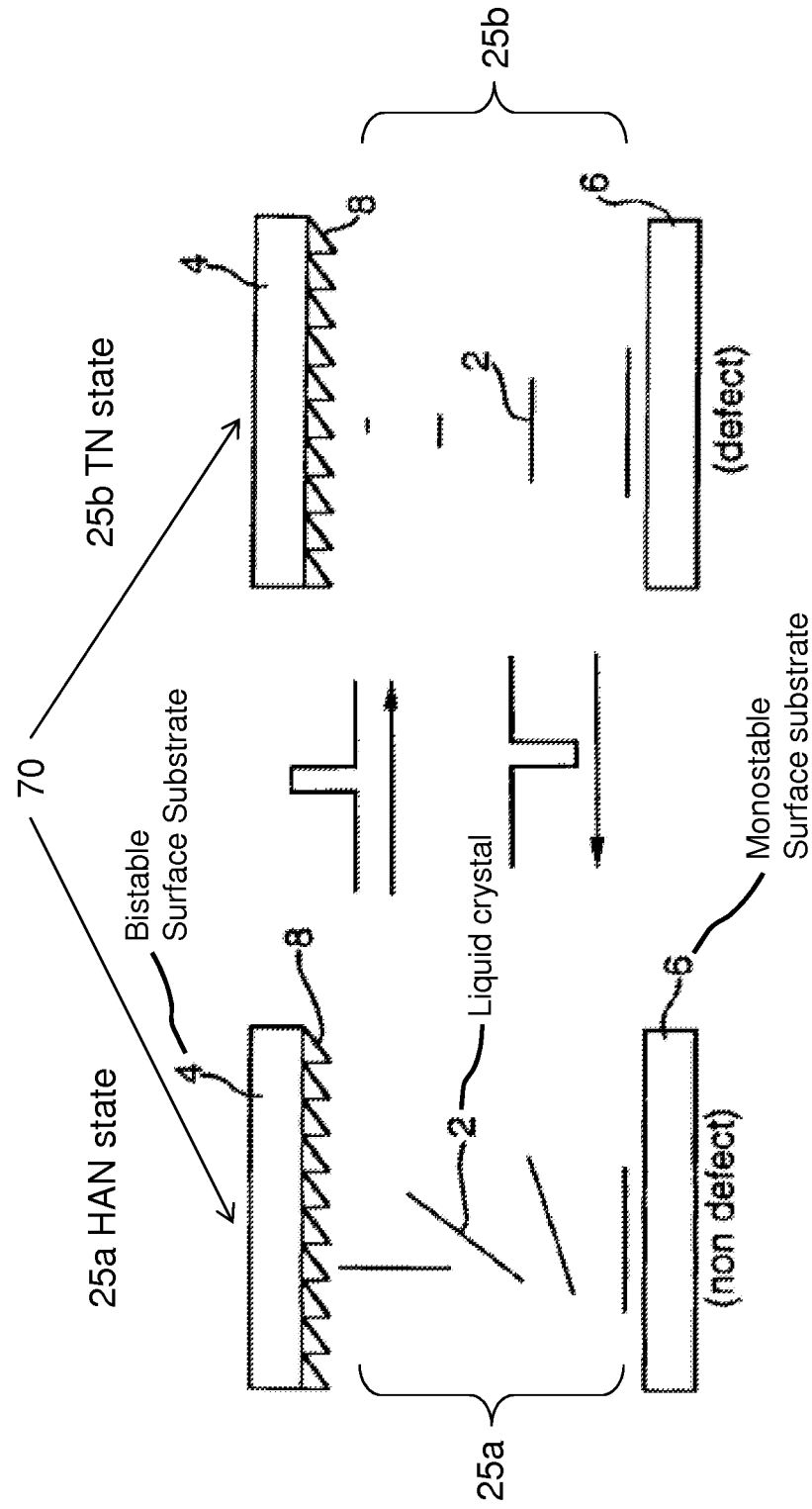
Figure 2: Conventional Art

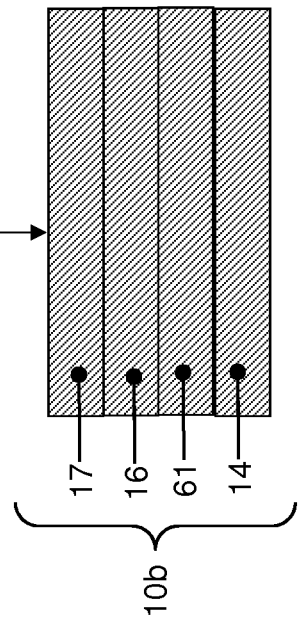
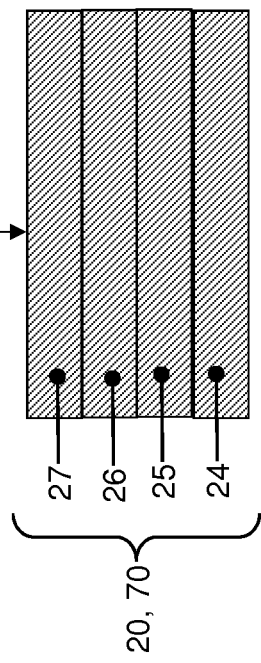
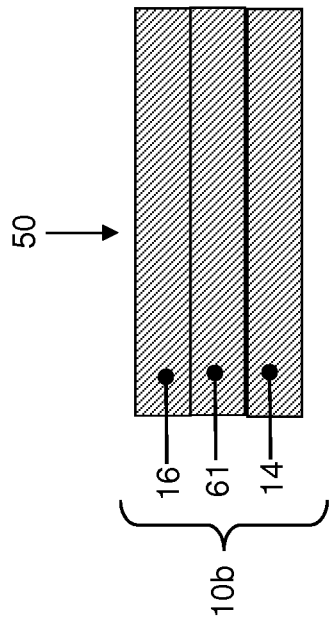
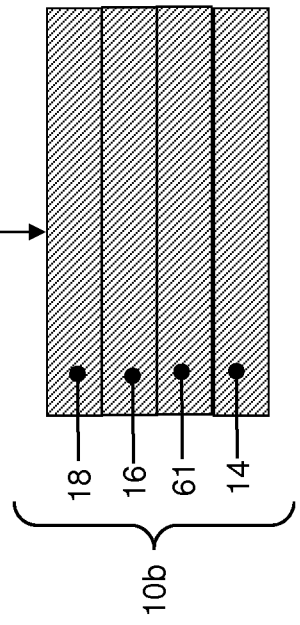

DISPLAY SYSTEM WITH SPECULAR REFLECTIVE MODE

TECHNICAL FIELD

This invention relates to a display system that has two displays and that has multiple display modes including a very low power consumption reflective display mode.

BACKGROUND ART

U.S. Pat. No. 7,495,719B2 (Adachi et al.; 24 Feb. 2009) describes a display device capable of being electrically switchable between a state that displays a high-quality image (normal mode) and a mirror mode. The mirror mode produces an easy-to-view reflection image suitable for a person to view his/her own face or figure. With reference to FIG. 1 of Adachi (also included as FIG. 1 herein), the display device has an image display portion 1000, a reflective polarization selection member 300, a transmission polarization axis variable portion 400, and an absorbing polarization selection member 500, which are successively disposed. The image display portion 1000 includes an absorbing polarization selection member 208 that transmits a linear polarization component of a predetermined direction and absorbs a linear polarization component of a direction orthogonal thereto, and the absorbing polarization selection member 208 is disposed at the reflective polarization selection member 300 side.

U.S. Pat. No. 5,686,979 (Weber et al.; 11 Nov. 2011) describes the use of a standard backlight, a reflective polariser film (DBEF), a first simple switchable liquid crystal panel and a second liquid crystal display (LCD) capable of showing images. These components are assembled to yield a display system that can be switched between a transmissive display mode that utilises the backlight and a reflective display mode that does not use the backlight. A reflective LCD is particularly useful for viewing images in high ambient lighting conditions. U.S. Pat. No. 5,686,979 also describes the use of reflective polariser films (DBEF) and a single image display to yield a display system capable of conveying text and monochrome pictures.

WO2014002402A1 (Smith et al.; 3 Jan. 2014) describes the use of reflective polariser films (DBEF) sandwiched between a first and second image display. The display system is capable of multiple image functions.

Bistable Liquid Crystal Displays are described by Bryan-Brown et al. "Grating Aligned Bistable Nematic Device", Proc SID XXVIII 5.3, pp 37-40 (1997) and U.S. Pat. No. 6,249,332 (Bryan-Brown et al.; 19 Jun. 2001) and U.S. Pat. No. 7,019,795 (Jones; 28 Mar. 2006). A bistable LCD has two energetically stable configurations of the liquid crystal molecules. Power is only required to switch from a first energetically stable state to the second energetically stable state. Consequently, a bistable LCD can be passively addressed with a first image, and power is only required to display a second image that is different from the first image. The bistable LC mode may be combined with optical components to enable a reflective bistable LCD. A reflective bistable LCD is particularly useful for viewing images in high ambient lighting conditions. A reflective bistable LCD is particularly useful for display applications requiring very low power consumption.

SUMMARY OF INVENTION

The battery on mobile display devices, in particular Smartphones, requires recharging regularly because the display consumes a lot of power. However, for many smartphone usage scenarios, a user does not require full colour high resolution images, for example, checking the time, reading a text message or email etc. In addition to a full colour, high resolution image display mode, the provision of a low power display system that can convey information, such as text or simple pictures, would therefore enable smartphone users to reduce the smartphone power consumption and prolong the time required between battery recharges. As discussed in the prior art, reflective bistable LCDs are ideally suited for display applications requiring very low power consumption.

When sunlight shines onto a display, images and text become hard to read. The provision of a display system that can clearly convey information to a user regardless of the strength of ambient sunlight would benefit a variety of applications, such as mobile phones, laptop PCs, automatic teller machines, advertising displays, and similar devices. As discussed in the prior art, reflective LCDs are particularly useful for viewing images in high ambient lighting conditions.

According to a first aspect of the invention, a display system is provided that includes from the viewing side: a first image display, an optical diffuser, a reflective polariser and a second image display. The first image display may be for example a liquid crystal display (LCD) or organic light emitting diode (OLED), and is capable of displaying high resolution, full colour images. The second image display may be a liquid crystal display. The second image display does not contain opaque Thin Film Transistors (TFT), and an image is displayed on the second image display via a passive addressing scheme (Duty-type driving) or a further addressing scheme that does not employ the use of opaque transistors or any other substantially opaque features. The second image display does not contain colour filters or any features that would provide a substantial, non-switchable parallax effect or substantial Moiré effect between the first and second image displays. The second image display is used in conjunction with the first image display to yield a display system that has multiple image displays functions, including a low power display mode with excellent sunlight readability.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIG. 1: A conventional electrically display device

FIG. 2: A conventional design and operation of a particular zenithal bistable liquid crystal display (ZBD)

FIG. 5: An organic light emitting type first image display, side view

FIG. 6: Alternative embodiment of an organic light emitting type first image display, side view FIG. 7: Additional alternative embodiment of an organic light emitting type first image display, side view FIG. 8: A second image display, side view

DESCRIPTION OF REFERENCE NUMERALS

Figure 4:
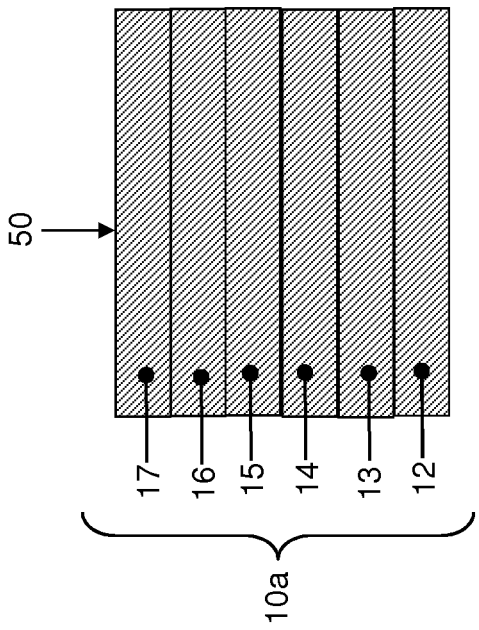
FIG. 4: A liquid crystal type first image display, side view

2 Liquid Crystal
4 Bistable surface substrate
6 Monostable surface substrate
8 Bistable surface
10 First image display
10a Liquid Crystal Display (LCD)
10b Organic light emitting display (OLED)
10P Polarisation state of light exiting the first image display
12 Backlight
13 Polariser element of the first image display 10
14 A first substrate of the first image display 10
15 Liquid crystal layer of the first image display 10
16 A second substrate of first image display 10
17 Polariser element of the first image display 10
18 A quarter wave retardation film
20 Second image display
24 A first substrate of the second image display 20
24A LC alignment direction of first substrate of the second image display 20
25 A liquid crystal layer of the second image display 20
26 A second substrate of the second image display 20
26A LC alignment direction of second substrate of the second image display 20
27 Polariser element of the second image display 20
27T Transmission axis of polariser
30 Reflective Polariser (Dual Brightness Enhancement Film)
30T Transmission axis of reflective polariser
30R Reflection axis of reflective polariser
40 Display system
50 Viewing side of display system
60 Optical Diffuser
61 An organic electroluminescent layer
70 A Zenithal Bistable Display (ZBD)

DETAILED DESCRIPTION OF INVENTION

Figure 3:
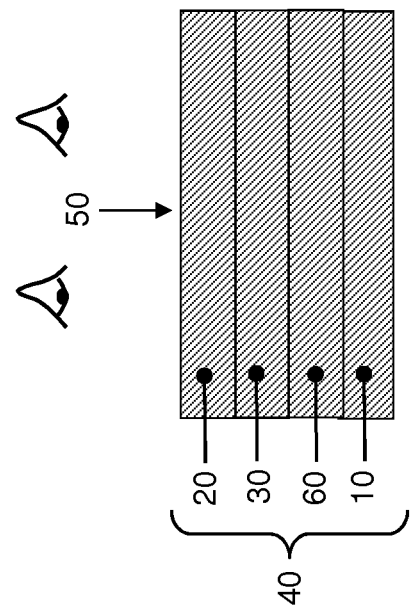
FIG. 3: Display System including two image displays

With reference to FIG. 3, a display system 40 includes a first image display 10, an optical diffuser 60, a reflective polariser 30 (such as a Dual Brightness Enhancement Film (DBEF)), and second image display 20. The display system 40 may also include a touch-screen (not shown) for inputting information that may be intrinsic or extrinsic to either the first image display 10 and/or the second image display 20. The viewing side 50 of the display system 40 is also shown.

The reflective polariser 30 and optical diffuser 60 may be combined into a single optical film. The single optical film may include a specular reflective DBEF 30 and an adhesive layer that has an optical diffuser function 60. The component that provides the optical diffuser function 60 may substantially maintain the polarisation state of light that passes through the optical diffuser 60. If the light emitted from the first image display 10 is polarised, then an optical diffuser that substantially maintains the degree of polarisation has the advantage that more light may be transmitted from the first image display 10 to the viewer. In other words, if the light emitted from the first image display is polarised then a polarisation preserving diffuser improves the light efficiency of the display system by enabling more light from the first image display 10 to reach the viewer.

The first image display 10 may be a liquid crystal display (LCD) 10a or an organic light emitting display (OLED) 10b, or any other type of image display. The LCD 10a may be a transmissive LCD or reflective LCD or transflective LCD. The first image display 10 is pixelated and may be capable of displaying high resolution, full colour images. The first image display 10 may be a passively addressed display or may be an actively addressed display.

The second image display 20 may be a liquid crystal display. The second image display may be a Zenithal Bistable Liquid Crystal Display. The second image display does not contain opaque Thin Film Transistors (TFT), and an image may be displayed on the second image display via a passive addressing scheme (duty-type driving) or a further addressing scheme that does not employ the use of opaque transistors. The second image display 20 is chosen to minimise any Moiré artefacts that may occur between the first image display 10 and the second image display 20. The human eye is particularly sensitive to Moiré artefacts, and therefore it may be difficult to completely suppress all Moiré artefacts between the first image display 10 and the second image display 20 if an optical diffuser 60 is not used. An unexpected and enhanced advantage is achieved over conventional configurations: the optical diffuser 60 can significantly reduce or eliminate Moiré artefacts while maintaining a high degree of image clarity from the first image display 10. In other words, Moiré artefacts may be significantly reduced or eliminated without a significant reduction in the perceived resolution of the first image display 10. This substantial advantage was achieved particularly well with a two layer optical film of reflective polariser 30 and optical diffuser 60.

With reference to FIG. 4, the first image display 10 may be a liquid crystal display 10a which includes a backlight 12, a first polariser 13, a first substrate 14, a liquid crystal layer 15, a second substrate 16 and a second polariser 17. The second polariser 17 is disposed on the viewing side 50 of the liquid crystal display 10a. The polarisers 13 and 17 may be linear polarisers or circular polarisers. Optical retardation films that improve the viewing angle performance and contrast ratio of the liquid crystal display 10a may be disposed between the first polariser 13 and the first substrate 14, and/or disposed between the second substrate 16 and the second polariser 17. For diagrammatic clarity, optical retardation films that improve the viewing angle performance and contrast ratio of the first image display LCD 10a have been omitted. The light exiting the polarising element on the viewing side 50 is linearly polarised with the transmission axis associated with the polarising element 17 and the transmission axis of the reflective polariser 30 aligned substantially parallel to each other.

With reference to FIG. 5, the first image display 10 may be an organic light emitting display (OLED) 10b which includes a first substrate 14, an organic electroluminescent layer 61 and a second substrate 16.

With reference to FIG. 6, the first image display 10 may be an organic light emitting display (OLED) 10b which includes a first substrate 14, an organic electroluminescent layer 61, second substrate 16 and a polarising element 17 disposed on the viewing side 50 of the OLED 10b. The polarising element 17 may be a linear polariser or a circular polariser. The advantage of the circular polariser is to prevent unwanted ambient light reflections from the electrodes within the OLED 10b and therefore improve the contrast ratio of the OLED 10b. The light exiting the polarising element on the viewing side 50 is linearly polarised with the transmission axis associated with the polarising element 17 and the transmission axis of the reflective polariser 30 aligned substantially parallel to each other.

With reference to FIG. 7, the first image display 10 may be an organic light emitting display (OLED) 10b which includes a first substrate 14, an organic electroluminescent layer 61, second substrate 16 and a quarter-wave retardation film 18 disposed on the viewing side 50 of the OLED 10b. The quarter-wave retardation film 18 is arranged so that linearly polarised light incident upon the quarter-wave retardation film 18 from the viewing side 50 creates circular polarised light. The optical axis of the quarter-wave retardation film is therefore arranged to be at substantially 45° to the linear polarisation state of the incident light from the viewing side 50. The advantage of the circular polarised light is to prevent unwanted ambient light reflections from the electrodes within the OLED 10b and therefore improve the contrast ratio of the OLED 10b.

With reference to FIG. 8, the second image display 20 is a liquid crystal display which includes a first substrate 24, a liquid crystal layer 25, a second substrate 26 and a polariser 27. Optical retardation films that improve the viewing angle performance and contrast ratio of the second image display 20 may be disposed on the outer face of the first substrate 24 and/or disposed between the second substrate 26 and the polariser 27. For diagrammatic clarity, optical retardation films that improve the viewing angle performance and contrast ratio of the second image display 20 have been omitted. For diagrammatic clarity, the LC alignment layers, control electronics, and other components pertaining to the second image display 20 has also been omitted from FIG. 8. The second image display 20 is a liquid crystal display that is preferably a low power liquid crystal display. A preferred second image display 20 is a Zenithal Bistable Liquid Crystal Display (ZBD) 70. The operation of the ZBD has been disclosed extensively in the literature. With reference to FIG. 2 (prior art), the ZBD has a first substrate 6 upon which is an LC alignment layer (not shown), such as polyimide, that may provide a monostable, low surface tilt of the LC molecules. With reference to FIG. 2 (prior art), the ZBD has a second substrate 8 upon which is an LC alignment layer that provides a bistable configuration of the LC molecules. A grating (as shown in FIG. 2) may provide the LC bistable surface. The first substrate 6 with monostable LC alignment layer may be the first substrate 24 in the display system 40 while the second substrate 8 with the bistable LC alignment layer may be the second substrate 26 in the display system 40. The first substrate 6 with monostable LC alignment layer may be the second substrate 26 in the display system 40 while the second substrate 8 with the bistable LC alignment layer may be the first substrate 24 in the display system 40.

With reference to FIG. 2 (prior art) a first, energetically stable configuration of the LC molecules in the ZBD 70 is a Hybrid Aligned Nematic state (HAN state) 25a. In the HAN state 25a, the bistable surface causes the LC molecules to adopt a high tilt in proximity to the bistable surface. A second, energetically stable configuration of the LC molecules in the ZBD 70 is a Twisted Nematic state (TN state) 25b. In the TN state 25b, the bistable surface causes the LC molecules to adopt a low tilt in proximity to the bistable surface. Switching between the HAN state 25a and the TN state 25b is achieved via application of a suitable waveform as shown schematically in FIG. 2 (prior art) and described in detail in the literature. The polarity of the pulse is a key factor as the whether the HAN state 25a or the TN state 25b is selected. By employing a matrix array of electrodes in a standard fashion, pixels within a ZBD 70 may be individually switched between the HAN state 25a and the TN state 25b.

Figure 9:
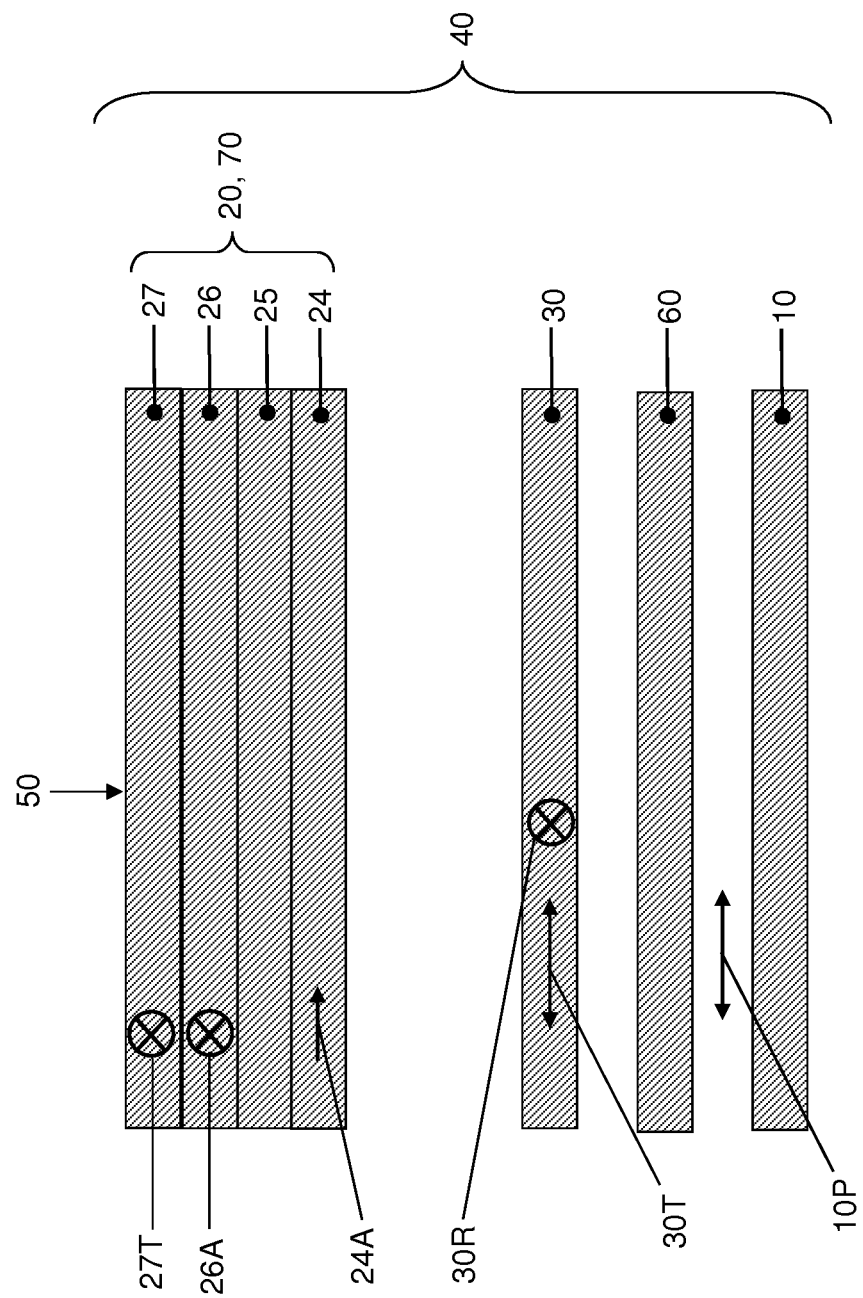
FIG. 9: Optical arrangement of a first image display and a second image display, exploded side view
Figure 10:
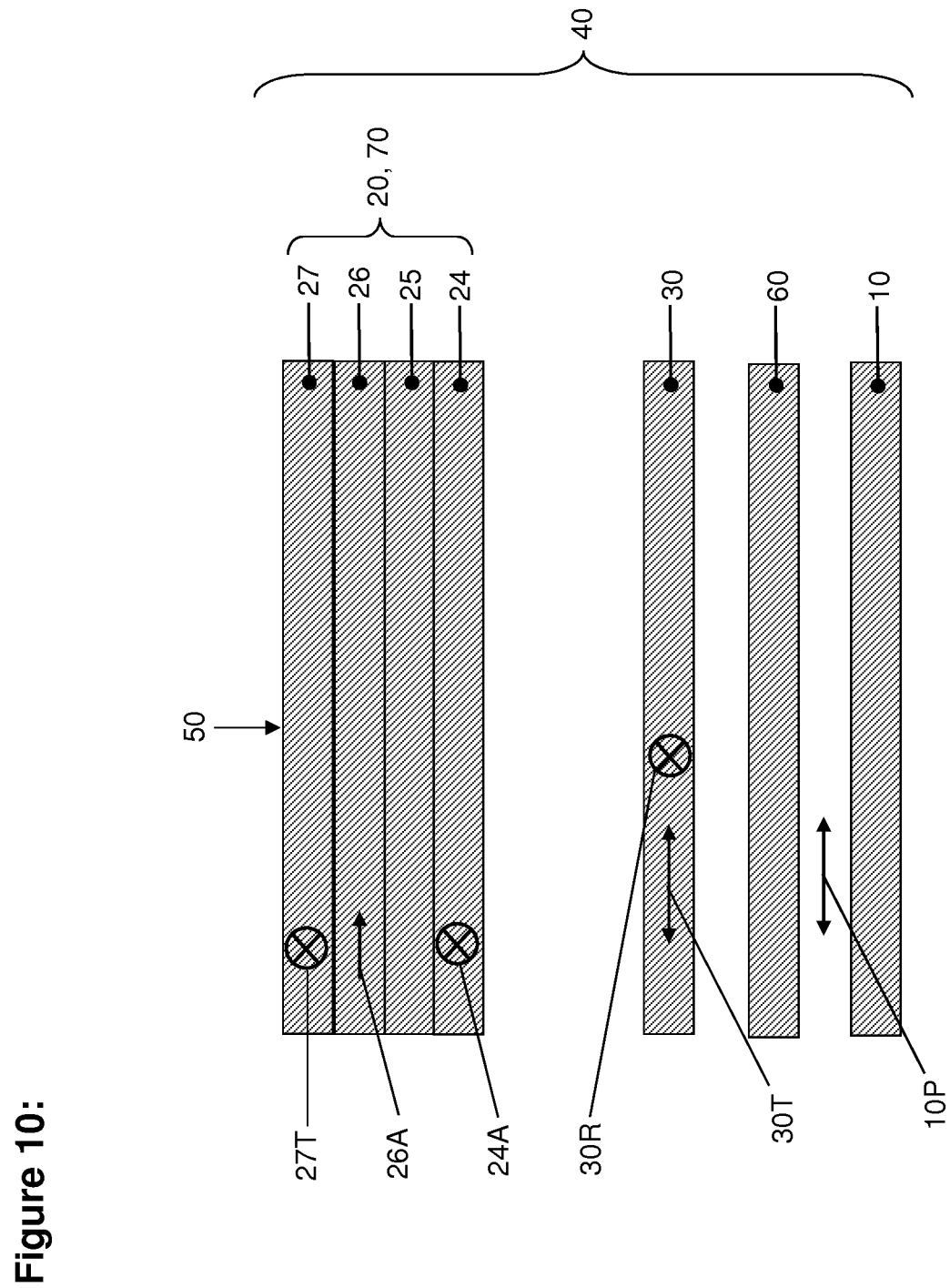
FIG. 10: Alternative embodiment of optical arrangement of a first image display and a second image display, exploded side view

With reference to FIG. 9 and FIG. 10, specific examples of the optical components required to realise the display system 40 are shown. FIG. 9 and FIG. 10 are exploded views of the display system 40 including the first image display 10, the reflective polariser 30, the optical diffuser 60 and the second image display 20. The components may be adhered together in optical contact with each other in order to form the display system 40. The display system 40 components in optical contact with each other has the advantage of minimising unwanted ambient reflections.

With reference to FIG. 9, the first image display 10 emits linearly polarised light 10P that is polarised parallel to the transmission axis 30T of the reflective polariser film 30. Upon passing through the optical diffuser 60, the polarisation state of the light may be substantially maintained. An advantage of the optical diffuser 60 substantially maintaining the polarisation state is that more light from the first image display 10 is conveyed to the user. In other words, the first display 10 appears brighter because absorption and/or reflection of the light from the first image display 10 by subsequent polarising elements is avoided. A further advantage of the optical diffuser 60 substantially maintaining the polarisation state is that ambient light transmitted through the second image display 20 may be more effectively prevented from exiting the display system 40, and thus provide a good quality dark state for images addressed to the second image display 20 (i.e. the second image display 20 may exhibit improved contrast between the black and white states).

With reference to FIG. 9, the orientation of the linearly polarised light 10P may be intrinsic or extrinsic to the design of the first image display 10. A half-wave retarder (not shown) may be employed to rotate the linear polarisation state of light exiting the first image display 10 so that the light incident on the reflective polariser 30 from the first image display 10 is polarised parallel to the transmission axis 30T of the reflective polariser 30. The second image display 20 is Zenithal Bistable Liquid Crystal Display (ZBD) 70. With the ZBD 70 switched into the TN state 25b, the liquid crystal alignment direction 24A associated with lowermost substrate 24 is arranged parallel to the transmission direction 30T of the reflective polariser 30. In the TN state 25b, the liquid crystal alignment direction 26A associated with the uppermost substrate 26 is always arranged perpendicular to the alignment direction 24A. The transmission axis 27T of the polariser 27 is arranged perpendicular to the reflective polariser transmission axis 30T.

Alternatively, with reference to FIG. 10, with the ZBD 70 switched into the TN state 25b, the liquid crystal alignment direction 24A associated with the lowermost substrate 24 may be arranged perpendicular to the transmission direction 30T of the reflective polariser 30. In the TN state 25b, the liquid crystal alignment direction 26A associated with the uppermost substrate 26 is always arranged perpendicular to the alignment direction 24A. The transmission axis 27T of the polariser 27 is arranged perpendicular to the reflective polariser transmission axis 30T.

A first display function of the display system 40 enables the user to view the first image display 10 as if the second image display 20 was not there. The first display function is achieved with the ZBD 70 switched into the TN state 25b.

Linearly polarised light emitted from the image display 10 is transmitted substantially unattenuated through the optical diffuser 60 and reflective polariser 30 and enters the ZBD 70. Upon exiting the ZBD the light is substantially linearly polarised and orientated substantially parallel to the transmission axis of the polarising element 27 i.e. the ZBD has sustainably rotated the axis of linear polarisation through 90°.

A second display function of the display system 40 is a specular reflective mode that enables the user to view a reflected image. The second display function may be achieved with the ZBD 70 switched uniformly into the HAN state 25*a*. The first image display is arranged to emit no light (i.e. the first image display is turned off, or is in stand-by mode, or displays a black image or has the backlight 14 (if applicable) turned off). To reduce power consumption, it is preferable that the first image display 10 is turned off. Ambient light incident substantially parallel to the normal of the Display System 40 (i.e. $\theta = \pm \sim 15°$ from the display normal) undergoes substantially no polarisation change upon traversing the liquid crystal layer 25 of the ZBD 70 switched into the HAN state 25*a*. Consequently, this ambient light is reflected by the reflective polariser 30 and is substantially transmitted through the polariser 27 in order to yield a mirror function.

Alternatively, the second display function may be achieved with the ZBD 70 switched uniformly into the TN state 25*b* and a voltage is applied across the TN state 25*b* such that ambient light incident substantially parallel to the normal of the display system 40 (i.e. $\theta = \pm \sim 15°$ from the display normal) undergoes substantially no polarisation change upon traversing the liquid crystal layer 25 of the ZBD 70. The first image display is arranged to emit no light (i.e. the first image display is turned off, or is in stand-by mode, or displays a black image or has the backlight 14 (if applicable) turned off). To reduce power consumption, it is preferable that the first image display 10 is turned off. Consequently, ambient light ($\theta = \pm \sim 15°$ from the display normal) is reflected by the reflective polariser 30 and is substantially transmitted through the polariser 27 in order to yield a mirror function. By varying the voltage across the TN state 25*b*, the reflectivity of the mirror may be adjusted. By increasing the voltage across the TN State 25*b*, the reflectivity of the mirror may be increased.

The advantage of using the HAN state 25*a* to achieve the mirror function is that no power is consumed while the LC layer is uniformly switched into the HAN state 25*a* (i.e. no voltage is required to maintain the mirror function). The advantage of using the TN state 25*b* to achieve the mirror function is that a mirror of variable reflectivity can be achieved (i.e. a voltage is required to maintain the mirror function and magnitude of the voltage is related to the reflectivity of the mirror function). Another advantage of using the TN state 25*b* to achieve the mirror function is that a mirror function may be activated more quickly than switching into the HAN state 25*a*.

A third display function of the display system 40 is a reflective mode that can convey information to the user. The first image display is arranged to emit no light (i.e. the first image display is turned off or is in stand-by mode or displays a black image or has the backlight 14 (if applicable) turned off). To reduce power consumption, it is preferable that the first image display 10 is turned off. The information is conveyed to the user by switching pixels of the ZBD 70 into either the HAN state 25*a* or the TN state 25*b*. As described previously, with the ZBD 70 switched into the HAN state 25*a*, ambient light is substantially reflected from the display system 40. With the ZBD 70 switched into the TN state 25*b*, ambient light is substantially transmitted through the reflective polariser 30 and is absorbed by the optical components of the first image display 10. Consequently, an image (and hence information) can be conveyed to the user via a combination of reflective pixels and black pixels. The third display function is essentially a mirror that can be patterned at the resolution of a pixel via an addressing scheme.

A fourth display function of the display system 40 can convey information to the user in an eye-catching and attractive fashion by addressing images to both the first image display 10 and the second image display 20. As described previously, with the ZBD 70 switched into the HAN state 25*a*, ambient light is substantially reflected from the display system 40. With the ZBD 70 switched into the TN state 25*b*, ambient light is substantially transmitted through the reflective polariser 30 and is absorbed by the optical components of the first image display 10. As previously described, the user can view the first image display 10 as if the second image display 20 was not there (i.e. the ZBD 70 appears substantially transparent) when the ZBD 70 is switched into the TN state 25*b*. With the ZBD 70 switched into the TN state 25*b*, the pixels of the first image display 10 are clearly revealed to the user. With the ZBD 70 switched into the HAN state 25*a*, a small proportion of light from the first image display 10 may be transmitted through the second display 20 to be observed by the user. These effects may be used to add to the attractiveness of the display mode. With the ZBD 70 switched into the TN state 25*b*, the proportion of light transmitted through the second display 20 from the first image display 10 and the proportion of light reflected from the reflective polariser 30 may adjusted via application of a voltage across the TN state 25*b*. This effect may also be used to add to the attractiveness of the display mode. Consequently, information can be conveyed to the user via a combination of reflective pixels (from ZBD 70) and pixels from the first image display. The reflective pixels from the second image display 20 and the pixels from the first image display may be laterally separated and/or laterally coincident (i.e. the viewer may perceive the reflective pixels from the second image display 20 and the pixels from the first image display 10 to emanate from different spatial locations from the display system 40 and/or the viewer may perceive the reflective pixels from the second image display 20 and the pixels from the first image display 10 to emanate from the same spatial location from the display system 40)

A fifth display function of the display system 40 enables the user to view autostereoscopic 3D images. Interlaced 3D images may be addressed to the first image display 10 in a standard fashion while the second image display 20 directs the stereoscopic images to the corresponding eyes of the user. Alternatively, 3D images may be addressed to the second image display 20 in a standard fashion while the first image display 10 directs the stereoscopic images to the corresponding eyes of the user. For the first image display 10 or second image display 20 to direct stereoscopic images to the corresponding eye, the first image display 10 or second image display 20 must perform an imaging function. The imagining function of the first image display 10 or the imaging function of the second image display 20 may be performed by an array of parallax barriers. The parallax barrier array is formed in either the first image display or the second image display by addressing some pixels with a black image and other pixels with a white image to create a periodic array of non-transmissive portions (black pixels) and transmissive portions (white pixels). The imagining function of the first image display 10 or the second image display 20 may be performed by an array of liquid crystal lenses. The imagining function of the first image display 10 and the second image display 20 may be performed by an array of liquid crystal lenses where each lens adjoins a parallax barrier element.

Aspects of the invention include various embodiments of a display system. In exemplary embodiments, the display system includes a first image display, a second image display, a specular reflective polariser disposed between the first image display and the second image display, with the second image display disposed on a viewing side of the display system, and an optical diffuser layer disposed between the first image display and reflective polariser.

In an exemplary embodiment of the display system, the optical diffuser layer is a polarisation maintaining optical diffuser.

In an exemplary embodiment of the display system, the specular reflective polariser and the optical diffuser layer are combined into a single film with the specular reflective polariser disposed on a viewing side of the display system, and the optical diffuser layer is disposed between the first image display and reflective polariser.

In an exemplary embodiment of the display system, the optical diffuser layer has an adhesive property.

In an exemplary embodiment of the display system, the reflective polariser is a Dual Brightness Enhancement Film (DBEF).

In an exemplary embodiment of the display system, the second image display is a Zenithal Bistable Liquid Crystal Display (ZBD), and further comprising controller configured to address the ZBD to switch pixels between first and second stable states.

In an exemplary embodiment of the display system, a pixel in the first stable state is substantially transparent to the first image display, and in the second stable state is reflective to the viewer.

In an exemplary embodiment of the display system, a retardation film is disposed between an uppermost substrate of the first image display and the reflective polariser.

In an exemplary embodiment of the display system, a retardation film is disposed between the reflective polariser and a lowermost substrate of the second image display.

In an exemplary embodiment of the display system, a polariser is positioned between an uppermost substrate of the first image display and the reflective polariser.

In an exemplary embodiment of the display system, an addressing scheme of the second image display does not utilize opaque transistors.

In further exemplary embodiments, the display system includes a first image display, a second image display, and a controller configured to address image data to the first image display and the second image display. The controller, the first image display and second image display are configured to selectively operate in accordance with a first display function in which the first image display is visible to a viewer through the second image display and the second image display appears substantially transparent to the first image display.

In an exemplary embodiment of the display system, the controller, the first image display and second image display are configured to selectively operate in accordance with a second display function in which the display system appears as a patterned mirror to the viewer.

In an exemplary embodiment of the display system, the first image display and second image display are configured to selectively operate in accordance with a third display function in which the display system appears as an unpatterned mirror to the viewer.

In an exemplary embodiment of the display system, the controller, the first image display and second image display are configured to selectively operate in accordance with a fourth display function in which image data from the first image display is visible to a viewer through the second image display and a patterned mirror is visible to the viewer from the second image display.

In an exemplary embodiment of the display system, the controller, the first image display and second image display are configured to selectively operate in accordance with a fifth display function in which the second image display functions as a switchable parallax optic to present autostereoscopic viewing to the viewer of three dimensional data presented by the first image display.

In an exemplary embodiment of the display system, the controller, the first image display and second image display are configured to selectively operate in accordance with a sixth display function in which the first image display functions as a switchable parallax optic to present autostereoscopic viewing to the viewer of three dimensional data presented by the second image display In an exemplary embodiment of the display system, the controller, the first image display and the second image display are configured to operate in accordance with two or more display functions simultaneously in different corresponding spatial regions.

In further exemplary embodiments, the display system includes a first image display, a second image display, a specular reflective polariser disposed between the first image display and the second image display, with the second image display disposed on a viewing side of the display system, an optical diffuser layer disposed between the first image display and reflective polariser, and a controller. The controller, the first image display and second image display are configured to selectively operate to pass light through the specular reflective polariser and the optical diffuser in accordance with multiple display functions in which the first image display and the second image display have different viewing properties to a viewer.

In an exemplary embodiment of the display system, the specular reflective polariser and the optical diffuser layer are combined into a single film with the specular reflective polariser disposed on a viewing side of the display system, and the optical diffuser layer is disposed between the first image display and reflective polariser.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

A display system that is suitable for watches, mobile phones, handheld games consoles, portable PCs, televisions etc.

The invention claimed is:

1. A display system, comprising:
a first pixelated image display;
a second pixelated image display;
a specular reflective polariser disposed between the first image display and the second image display, with the second image display disposed on a viewing side of the display system; and
an optical diffuser layer disposed between the first image display and reflective polarizer on a light emitting side of the first image display, wherein the optical diffuser maintains a polarisation state of light that passes through said optical diffuser.

2. The display system according to claim 1, wherein the specular reflective polariser and the optical diffuser layer are combined into a single film with the specular reflective polariser disposed on a viewing side of the display system, and the optical diffuser layer is disposed between the first image display and reflective polariser.

3. The display system according to claim 1, wherein the optical diffuser layer has an adhesive property.

4. The display system according to claim 1, wherein the reflective polariser is a Dual Brightness Enhancement Film (DBEF).

5. The display system according to claim 1, wherein the second image display is a Zenithal Bistable Liquid Crystal Display (ZBD), and further comprising controller configured to address the ZBD to switch pixels between first and second stable states.

6. The display system according to claim 5, wherein a pixel in the first stable state is substantially transparent to the first image display, and in the second stable state is reflective to the viewer.

7. The display system according to claim 1, wherein a retardation film is disposed between an uppermost substrate of the first image display and the optical diffuser.

8. The display system according to claim 1, wherein a retardation film is disposed between the reflective polariser and a lowermost substrate of the second image display.

9. The display system according to claim 1, wherein a polariser is positioned between an uppermost substrate of the first image display and the optical diffuser.

10. The display system according to claim 1, wherein an addressing scheme of the second image display does not utilize opaque transistors.

11. The display system of claim 1, further comprising:
a controller configured to address image data to the first image display and the second image display;
wherein the controller, the first image display and second image display are configured to selectively operate in accordance with:
a first display function in which the first image display is visible to a viewer through the second image display by the controller controlling the second image display to be substantially transparent to light emitted by the first image display;
a second display function in which the display system appears as a specular mirror to the viewer by the controller controlling the first image display to emit no light and controlling the second image display to be uniform for the transmission of light such that ambient light is reflected by the reflective polarizer; and
a third display function in which the display system appears as a patterned mirror to convey information to the viewer by the controller controlling the first image display to emit no light and controlling the second image display to be patterned for the transmission of light such that ambient light is reflected by the reflective polarizer in accordance with the pattern.

12. The display system according to claim 11, wherein the controller, the first image display and second image display are configured to selectively operate in accordance with a fourth display function in which image data from the first image display is visible to a viewer through the second image display and a patterned mirror is visible to the viewer from the second image display.

13. The display system according to claim 11, wherein the controller, the first image display and second image display are configured to selectively operate in accordance with a fifth display function in which the second image display functions as a switchable parallax optic to present autostereoscopic viewing to the viewer of three dimensional data presented by the first image display.

14. The display system according to claim 11, wherein the controller, the first image display and second image display are configured to selectively operate in accordance with a sixth display function in which the first image display functions as a switchable parallax optic to present autostereoscopic viewing to the viewer of three dimensional data presented by the second image display.

15. The display system according to claim 11, wherein the controller, the first image display and the second image display are configured to operate in accordance with two or more display functions simultaneously in different corresponding spatial regions.

16. A display system comprising:
a first pixelated image display;
a second pixelated image display;
a specular reflective polariser disposed between the first image display and the second image display, with the second image display disposed on a viewing side of the display system;
an optical diffuser layer disposed between the first image display and reflective polariser on a light emitting side of the first image display, wherein the optical diffuser maintains a polarisation state of light that passes through said optical diffuser; and
a controller;
wherein the controller, the first image display and second image display are configured to selectively operate to pass light through the specular reflective polariser and the optical diffuser in accordance with multiple display functions in which the first image display and the second image display have different viewing properties to a viewer;
and wherein:
the second image display has a liquid crystal layer, a first substrate disposed on a non-viewing side relative to the liquid crystal layer, and a second substrate disposed on the viewing side relative to the liquid crystal layer;
the second image display is a Zenithal Bistable Liquid Crystal Display (ZBD) that is switchable by the controller between a twisted nematic (TN) configuration of liquid crystal molecules and a hybrid aligned nematic (HAN) configuration of liquid crystal molecules;

the first image display emits light linearly polarised in a first direction, and a transmission axis of the reflective polariser is arranged in the first direction;

when the ZBD is switched into the TN configuration, the alignment direction of the liquid crystal molecules of the first substrate is in the second direction perpendicular to the first direction;

when the ZBD is switched into the TN configuration, the alignment direction of the liquid crystal molecules of the second substrate is in the first direction; and a polariser that has a transmission axis in the second direction is disposed on the viewing side of the second image display.

17. The display system of claim 16, wherein the specular reflective polariser and the optical diffuser layer are combined into a single film with the specular reflective polariser disposed on a viewing side of the display system, and the optical diffuser layer is disposed between the first image display and reflective polariser.

18. The display system of claim 16, wherein the controller, the first image display and second image display are configured to selectively operate in accordance with:

a first display function in which the first image display is visible to a viewer through the second image display by the controller controlling the second image display to be substantially transparent to light emitted by the first image display;

a second display function in which the display system appears as a specular mirror to the viewer by the controller controlling the first image display to emit no light and controlling the second image display to be uniform for the transmission of light such that ambient light is reflected by the reflective polarizer; and a third display function in which the display system appears as a patterned mirror to convey information to the viewer by the controller controlling the first image display to emit no light and controlling the second image display to be patterned for the transmission of light such that ambient light is reflected by the reflective polarizer in accordance with the pattern.

19. The display system according to claim 18, wherein for the first display function the controller switches the ZBD into the TN configuration.

20. The display system according to claim 18, wherein for the second and/or third display functions the controller switches at least a portion of the ZBD into the HAN configuration.

* * * * *